UNITED STATES PATENT OFFICE.

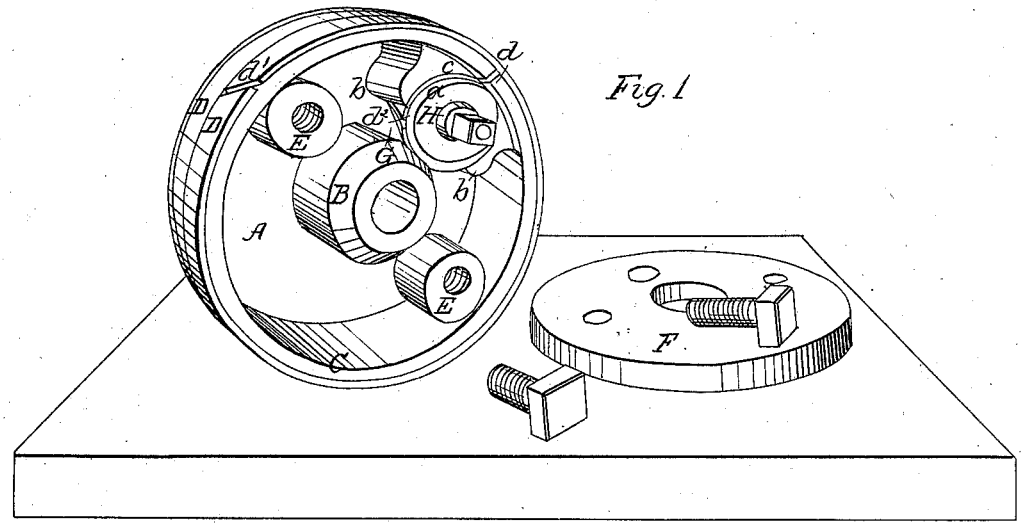
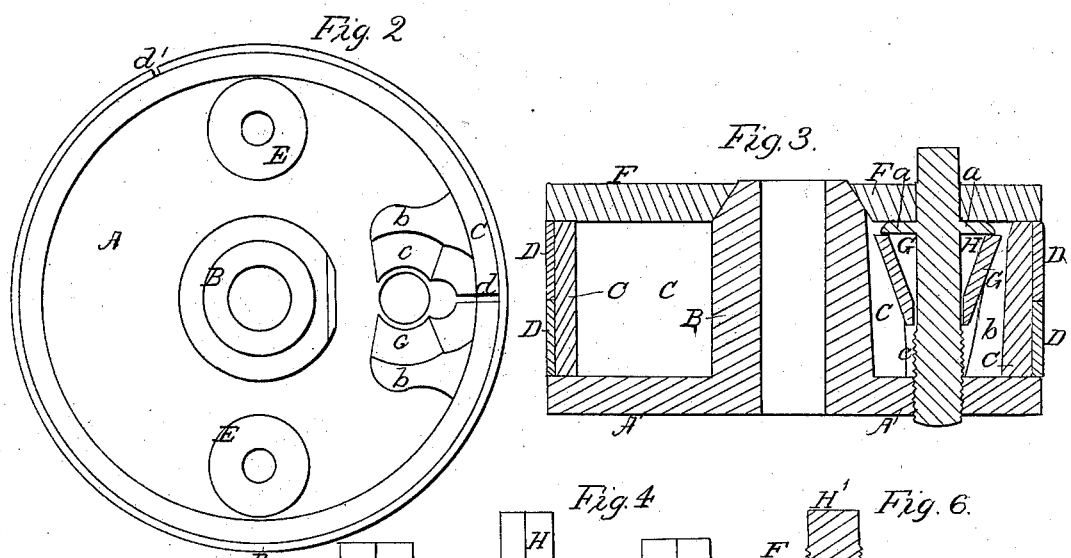
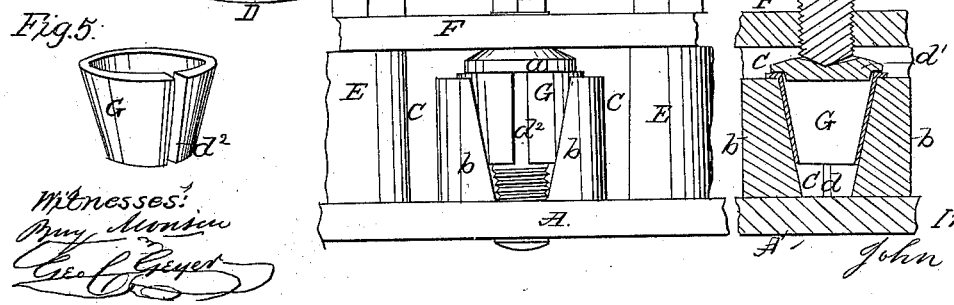

JOHN CRABTREE, OF PHILADELPHIA, PENNSYLVANIA.

ADJUSTING THE PACKING OF PISTONS FOR STEAM-ENGINES.

Specification of Letters Patent No. 10,856, dated May 2, 1854.

*To all whom it may concern:*

Be it known that I, JOHN CRABTREE, of the city of Philadelphia and State of Pennsylvania, have invented a new and useful Improvement in the Mode of Tightening or Adjusting the Packing of Pistons of Steam and other Engines; and I do hereby declare that the following is a full, clear, and exact description of the construction and operation of the same, reference being had to the annexed drawings, making a part of this specification, in which—

Figure 1 is a perspective view of a piston having the plate or cover removed, showing the improvement applied. Fig. 2 is a plan view of the same having the open conical ring and its flanged adjusting screw removed. Fig. 3, is a vertical section through the center of the piston, showing the improvement applied. Fig. 4, is an elevation of part of the same across at right angles to the last section and having the center boss removed. Fig. 6, is a section of the same, having a follower and short adjusting screw bolt substituted for the long flanged screw bolt shown in Figs. 3 and 4; and Fig. 5, is a perspective view of the open conical ring.

The same letters indicate like parts in the several figures.

The nature of my invention consists in a peculiar mode of constructing and applying to the piston of an engine a small open conical ring, between two lugs cast on the inside of the main inner ring, so that by turning an adjusting screw bolt, (whose outer end projects through the cover of the piston) the packing rings can be properly adjusted, (tightened or loosened) without taking off the cylinder head, by means of a wrench or other suitable instrument, to be passed through an appropriate hole in the cylinder head or cover.

A, is the piston head, B, the center boss in which the piston rod is secured—C, the main inner ring—D, D, the outer or packing rings—E, E, the bosses for receiving the screw bolts which hold the covering plate to the piston—G, the open conical ring—H, the long adjusting screw bolt—$a$ the flange on the long adjusting screw bolt—$a^1$, the follower which may be substituted for the flange and $H^1$, the short adjusting screw which may be substituted for the longer one—$b$, $b$, the two lugs cast on the main inner ring, each having conical curves ($c$, $c$,) adapted to the small open conical ring (G)—$d$, the opening in the main inner ring—$d^1$, opening in the packing rings—and $d^2$, opening in the small conical ring.

The piston head and cover is made in the usual manner. The main inner ring is made cylindrical and open, so as to be slightly elastic, and near the opening or slot, and on each side thereof, the lugs ($b$, $b$,) are cast, forming part of the ring.

The outer or packing rings (D, D,) (two or more) are made so as to clasp round on the outer surface of the inner ring (C,) having their openings ($d'$) cut obliquely and placed so as to break joints in the usual manner.

The small open conical ring (G) is made to fit the two conical surfaces ($c$, $c$,) of the lugs ($b$, $b$,) these surfaces being made so as to touch the ring (G) only on its two opposite sides. The adjusting screw bolt (H) has a flange ($a$) which fits on the upper edge of the ring (G,) its lower end having a thread adapted to a screw hole in the piston head, and its upper end projecting through the covering plate (F) and adapted for a wrench.

In Fig. 6 another mode of constructing this screw bolt, is thrown. In this case, the bolt ($H^1$) is made shorter, and so as to screw into the covering plate (F) and bear with its lower end against a follower ($a^1$) which is made to fit loosely on the upper end of the conical ring (G). The small conical ring (G) is made so as to be slightly elastic, and yield to compression from any slight inequality of the bore of the cylinder, during the motion of the piston. All the parts of the piston are made of cast iron, except the screw bolts—these may be made of wrought iron—or the adjusting screw bolts (H or $H^1$) and the surrounding parts, in immediate connection therewith may, very properly be made of copper or any other suitable metal less liable to oxidation.

The edges of the packing rings (D, D,) are fitted nicely to each other, and to the inner packing (C), and also so as to fit up closely against the piston plates when the covering plate (F) is screwed up against the bosses. The piston being finished and combined as herein described and illustrated, it is obvious that by screwing in the adjusting screw bolt (H or $H^1$) by means of a wrench or other appropriate instrument, that the small open conical ring (G) will be forced to slide between the lugs ($b$, b,) forcing them apart, enlarging the main inner ring (C) and consequently the concentric packing rings (D, D,) which is the effect desired to be accomplished—and supposing the piston inclosed within a steam or other cylinder, and a small hole through the cylinder head or cover, directly opposite to the square end of the adjusting screw, sufficiently large to admit a key wrench—it is also obvious that the packing of the piston can be adjusted properly without taking off the cylinder head or cover. In marine engines this can be done through the "manhole"—but in land engines a small hole is to be made especially and fitted with a steam tight screw plug.

Having thus given a full, clear, and exact description of the construction and operation of my invention, I proceed to state that I do not claim the packing rings concentric with and clasping the inner ring—nor the inner ring and packing rings in combination—nor do I claim adjusting the packing of pistons through a hole in the cylinder head—but

What I claim as my invention and desire to secure by Letters Patent, is—

The open conical ring (G,) in combination with the lugs (b, b,) or their equivalents cast on the open inner ring (C)—and the flanged adjusting screw (H) or its equivalent, the shorter adjusting screw (H¹) and follower (a′) arranged and combined substantially and for the purpose as herein described and illustrated.

JOHN CRABTREE.

Witnesses:
GEO. C. GEYER,
BENJ. MONSON.